United States Patent
Canterberry et al.

(10) Patent No.: US 6,908,104 B2
(45) Date of Patent: Jun. 21, 2005

(54) PYROTECHNIC SIDE IMPACT INFLATOR

(75) Inventors: J B Canterberry, Apollo Beach, FL (US); Keith Lam, Lakeland, FL (US); Robert Mark Spangler, Plant City, FL (US)

(73) Assignee: Key Safety Systems, Inc., Sterling Heights, MI (US)

( * ) Notice: Subject to any disclaimer, the term of this patent is extended or adjusted under 35 U.S.C. 154(b) by 3 days.

(21) Appl. No.: 10/648,324

(22) Filed: Aug. 27, 2003

(65) Prior Publication Data

US 2005/0046161 A1 Mar. 3, 2005

(51) Int. Cl.[7] .............................................. B60R 21/26
(52) U.S. Cl. ...................................... 280/736; 280/741
(58) Field of Search ............................... 280/736, 741, 280/742

(56) References Cited

U.S. PATENT DOCUMENTS

| | | | | |
|---|---|---|---|---|
| 5,556,131 A | | 9/1996 | Bender et al. | |
| 5,611,566 A | * | 3/1997 | Simon et al. | 280/736 |
| 5,645,298 A | * | 7/1997 | Stevens et al. | 280/741 |
| 5,716,072 A | * | 2/1998 | O'Driscoll | 280/740 |
| 6,056,319 A | * | 5/2000 | Ruckdeschel et al. | 280/741 |
| 6,065,774 A | | 5/2000 | Cabrera | |
| 6,068,290 A | * | 5/2000 | Sheng | 280/736 |
| 6,149,193 A | * | 11/2000 | Canterberry et al. | 280/741 |

\* cited by examiner

*Primary Examiner*—Eric Culbreth
(74) *Attorney, Agent, or Firm*—Lonnie Drayer; Jarett Rieger

(57) ABSTRACT

A pyrotechnic side impact inflator is provided for inflating a side airbag in an automobile. The inflator has a few number of physical components and has a tubular shape. The inflator has an igniter that directly ignites the main gas generant in the inflator. The burning of the gas generant produces combustion products or inflation gas that is utilized to inflate a folded airbag. The inflation gas travels in a tortuous path in the inflator, which reduces the kinetic energy associated with the gas molecules thereby cooling the inflation gas.

16 Claims, 3 Drawing Sheets

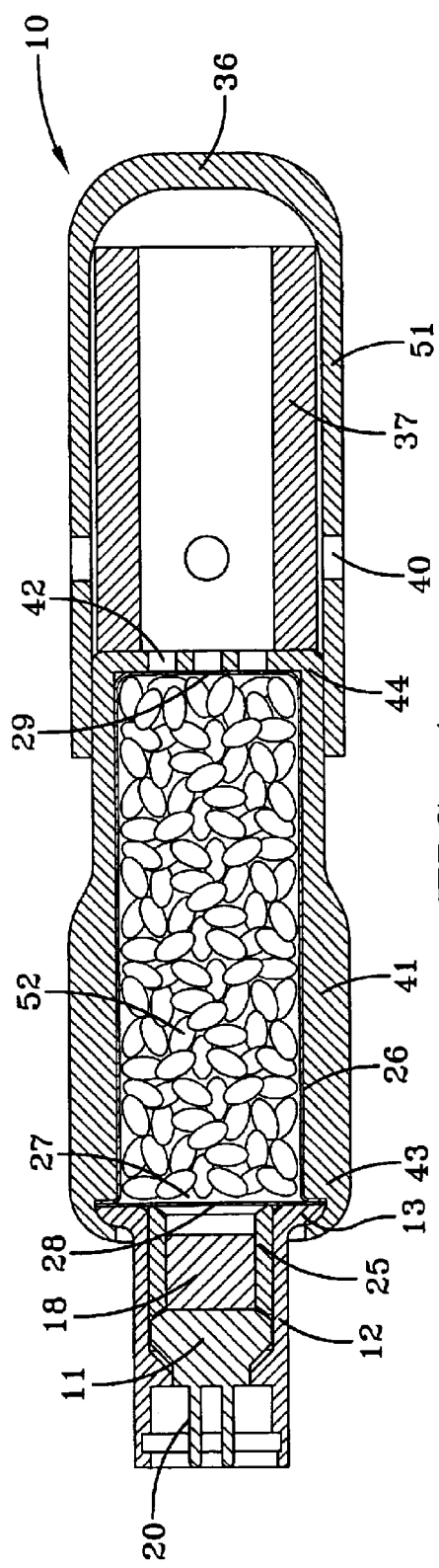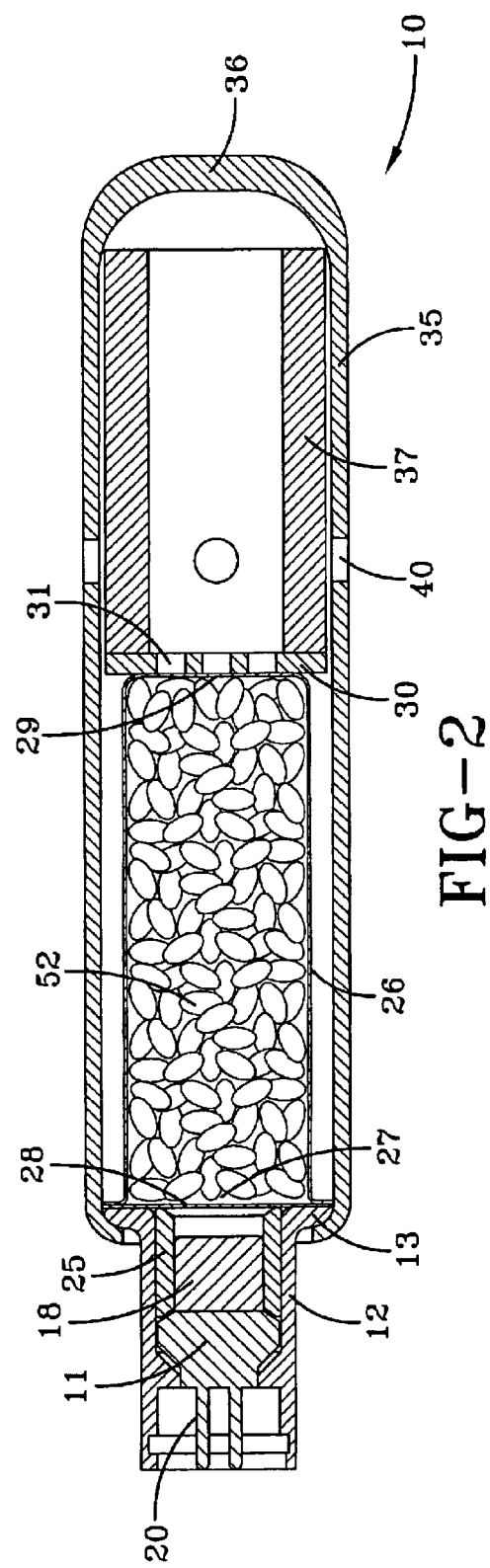

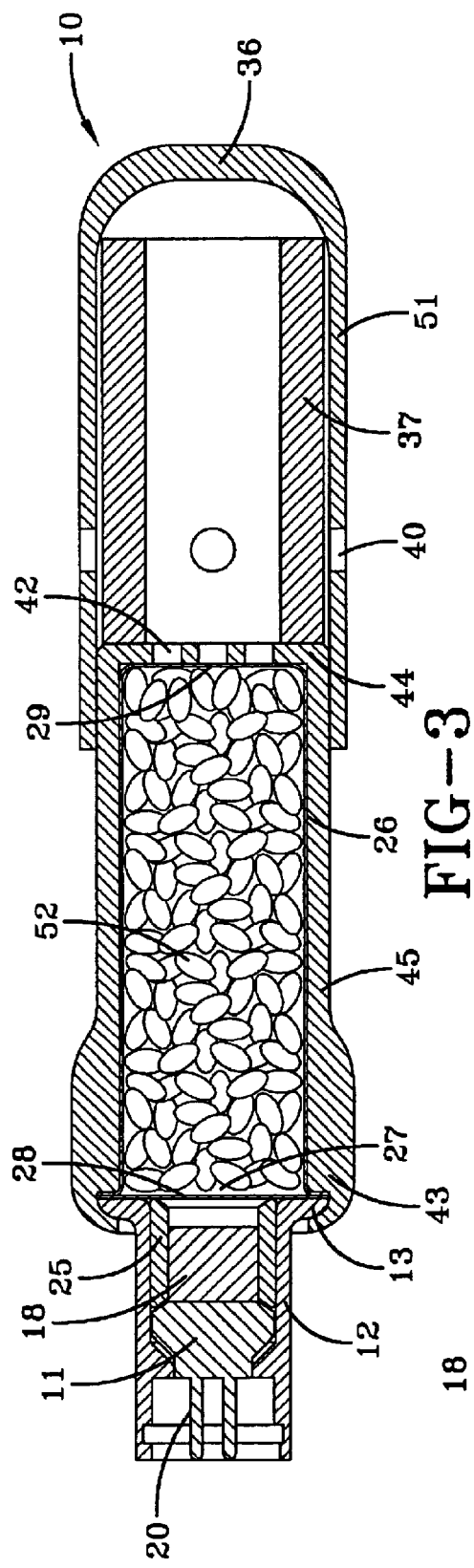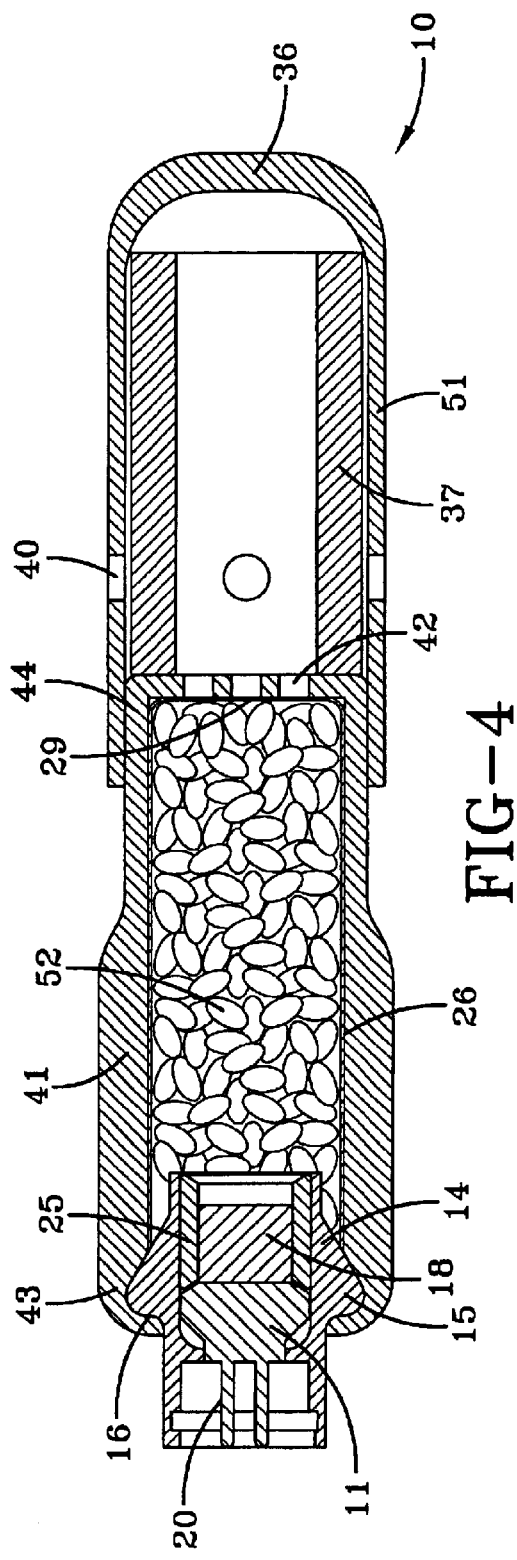

PYROTECHNIC SIDE IMPACT INFLATOR

FIELD OF THE INVENTION

The present invention relates generally to inflators for use in inflating inflatable restraint airbag cushions and particularly relates to pyrotechnic inflators that provide inflation gas to rapidly inflate side airbags in automobiles.

BACKGROUND OF THE INVENTION

An airbag system is an example of a supplemental restraint system for an automobile and has been developed to protect vehicle occupants from sustaining injuries during automotive crashes. During an automotive crash, an airbag is rapidly filled with inflation gas to provide an energy-absorbing cushion between the vehicle occupant and a hard surface of the vehicle. The inflated airbag absorbs the vehicle occupant's energy to provide a gradual, controlled deceleration of the vehicle occupant, and the airbag also provides a cushion for distributing the loads on the vehicle occupant. Airbags are placed in a number of different locations in the automobile. Airbags installed in the doorframe or in the seat of the automobile are known as side airbags. The side airbags protect vehicle occupants during side impact crashes and rollovers; the side airbags protect vehicle occupants from colliding with doors, pillars, and/or the roof of the automobile.

An inflator is the device in the airbag system that releases inflation gas into the folded airbag. The inflation gas rapidly fills the airbag in a fraction of a second so the airbag is fully deployed before the vehicle occupant interacts with the airbag. A common type of inflator suitable for inflating a side airbag is a pyrotechnic inflator. A pyrotechnic inflator contains pyrotechnic material or gas generant. The gas generant is an exothermic chemical mixture, and upon ignition, the gas generant produces gaseous combustion products or inflation gas. The inflation gas exits the inflator and flows into the folded airbag.

The pyrotechnic side impact inflator needs to be of a relatively small size to meet the stringent size and configuration limitations for side impact inflators. Co-assigned United States patent, U.S. Pat. No. 6,065,774, teaches a tubular side impact inflator having a filtration system consisting of a bed of expanded metal chips. U.S. Pat. No. 5,556,131 teaches a simple and small size pyrotechnic side impact inflator.

Since side airbags are being installed in increasing number of automobiles each year, there is a desire to develop simpler and cheaper pyrotechnic side impact inflators.

SUMMARY OF THE INVENTION

A pyrotechnic side impact inflator of cylindrical shape having a longitudinal axis in accordance with the present invention has an igniter that directly ignites a gas generant. The fuel and the oxidizer of the gas generant react with one another to produce inflation gas that passes through a tubular filter before exiting the inflator. The filter traps solid particles carried by the inflation gas to prevent the solid particles from entering the airbag.

An aspect of the present invention is the use of a generant cup. The gas generant is stored in a completely sealed generant cup. The burning of the gas generant produces sufficient energy to rupture the bottom of the generant cup. The inflation gas flows through the bottom of the generant cup and into a combustion chamber and then into a filter housing containing the filter. The combustion chamber has apertures for reducing the gas flow into the filter housing. The filter housing completely receives the filter and only partially receives the generant cup.

Another aspect of the present invention is to include an inflator housing that fully receives the filter and the generant cup. The burning of the gas generant ruptures the bottom of the generant cup. The gas flows through the bottom of the generant cup and then through aperture openings in a choke plate. The choke plate limits the gas flow. The gas flows through the filter and out of the inflator.

Another aspect of the present invention is to use a combustion chamber that functions two-fold. First, the combustion chamber stores the gas generant. Second, the combustion chamber has apertures for reducing the gas flow into the filter housing. The combustion chamber is airtight and prevents the incursion of moisture therein. The first end of the combustion chamber is welded to an igniter retainer. The second end has apertures, and a burst foil is adhered to the second end and covers these apertures. In each embodiment of the invention each of the gas exit ports is in closer proximity to the apertures than the end of the filter housing or inflator housing. The apertures being located between the gas generant and the filter.

BRIEF DESCRIPTION OF THE DRAWINGS

With this summary of the invention, a detailed description follows with reference being made to the accompanying drawings which form part of the specification in which like parts are designated by the same reference numbers and of which:

FIG. 1 shows a cross section of a pyrotechnic side impact inflator.

FIG. 2 shows a cross section of a second embodiment of the pyrotechnic side impact inflator.

FIG. 3 shows a cross section of a third embodiment of the pyrotechnic side impact inflator.

FIG. 4 shows a cross section of a fourth embodiment of the pyrotechnic side impact inflator.

DETAILED DESCRIPTION OF THE INVENTION

Figure 5:
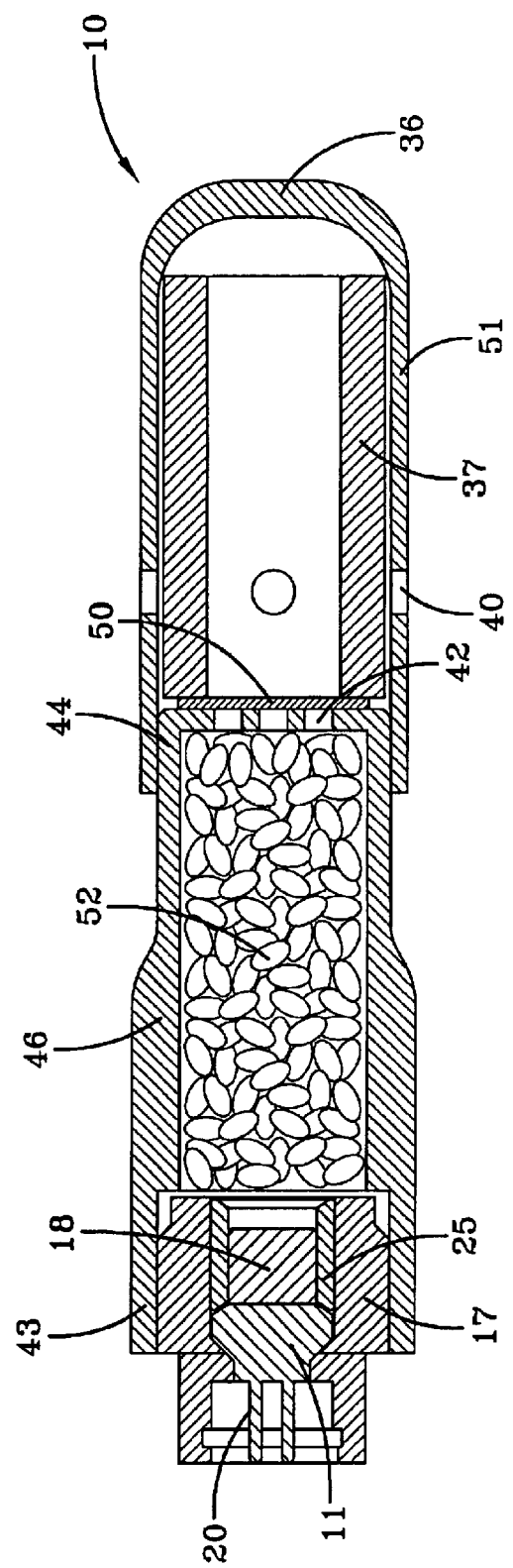
FIG. 5 shows a cross section of a fifth embodiment of the pyrotechnic side impact inflator.

With reference to FIG. 1, a cross sectional view of a cylindrically shaped side impact inflator 10 is shown. The inflator 10 has an electrical igniter 11 for igniting the gas generant 52. The electrical igniter 11 is operatively connected to an electronic control unit (not shown). The electronic control unit receives electrical signals from crash and/or vehicle occupant sensors. The crash sensors measure deceleration while the vehicle occupant sensors measure occupant size and occupant position relative to the folded airbag. The electronic control unit processes the signals by running algorithms to determine if a side airbag (not shown) should be deployed. If the electronic control unit determines that the side airbag is necessary, then the electronic control unit sends a firing signal to the side impact inflator 10 causing the side impact inflator 10 to release inflation gas into the side airbag.

The side impact inflator 10 is deployed when the igniter 11 receives a firing signal from the electronic control unit. The electrical igniter 11 has a pair of electrodes 20 insulated from one another. The electrodes 20 are connected to one another via a bridge wire, which is characterized by having a large amount of resistance. The bridge wire is embedded in ignition material 18 such as zirconium perchlorate potassium. As current flows along the bridge wire on the electrical igniter 11, heat is generated, which is utilized to light the ignition material 18. The burning of the ignition material 18 produces hot gaseous products. A retaining ring 25 is fixedly attached to the igniter 11 and serves the function of channeling the hot gaseous products from the igniter 11 to the lid 28 of the generant cup 26. The retaining ring 25 has a cylindrical geometry and surrounds the ignition material 18 of the igniter 11. The gaseous products from the igniter 11 rupture the lid 28 of the generant cup 26 thereby exposing the gas generant to the gaseous products from the igniter 11. The igniter 11 in the present invention directly ignites the gas generant 52 disposed in the generant cup 26. The present invention does not require a booster composition or an enhancer to ignite the gas generant 52. The present invention employs a bridge wire igniter, but any other heat source may be employed such as semiconductor bridge igniter and the like.

The gas generant 52 is a pyrotechnic mixture containing a fuel and an oxidizer. The fuel is selected from one or more of the following: tetrazole, amino-tetrazole, nitroguanidine, guanidine nitrate, triazoles, and the like. The oxidizer is selected from one or more of the following: oxides, nitrates, ammonium nitrate, chlorates, perchlorates, and the like. Once ignited, the gas generant 52 burns rapidly to produce hot combustion gas or inflation gas useful for inflating the airbag.

An igniter retainer 12 is adapted to receive the igniter 11. The igniter 11 is secured in position via interference fit, however the igniter 11 may be secured by threads, adhesive, welding, and the like. The igniter retainer 12 may be made from a metal material or from a plastic material. If the igniter retainer 12 is injection molded, then the plastic material must be able to withstand deformation during a welding procedure. The igniter retainer 12 has an annular lip 13 at the end facing the gas generant 52. Notwithstanding the lip 13, the exterior surface of the igniter retainer 12 has a cylindrical shape.

As seen in FIG. 1, the gas generant 52 is shown as pellets or granules and is randomly distributed in the space within the generant cup 26. The generant cup 26 has an open end 27 facing the igniter 11. A lid 28 is fixedly attached to the open end 27 of the generant cup 26 via ultrasonic welding or any other suitable method. The generant cup 26 with the sealed lid 28 provides an airtight space for the gas generant 52 to occupy. To prevent raffling and abrasion among gas generant pellets, ceramic spacers (not shown) may be added to the gas generant pellets 52 to fill the empty space within the generant cup 26.

The generant cup 26 is disposed within the combustion chamber 41. The combustion chamber 41 has a first end 43 that is crimped around the lip 13 of the igniter retainer 12, and the combustion chamber 41 has a second end 44 containing a plurality of apertures 42. The combustion chamber 41 is telescopically inserted into a filter housing 51 and secured by welding or other suitable means. A longitudinal axis for the cylindrical generant cup 26 is parallel with a longitudinal axis for the tubular filter 37. The filter housing 51 has a plurality of exit ports 40 arranged around the circumference thereof. The exit ports 40 are aligned with the filter 37 or in other words a geometric plane that is perpendicular to the filter housing 51 and passes through the exit ports 40 will cut through a portion of the filter 37. The number and size of the exit ports 40 may vary so long as the inflator 10 is thrust neutral when inflation gas exits the inflator 10. The exit ports 40 are not covered so atmospheric gas is present within the filter housing 51. The filter housing 51 receives the filter 37 and the filter 37 is held in place by the second end 44 of the combustion chamber 41 and the closed end 36 of the filter housing 51. The filter 37 is made from metal wire and is knitted in a tubular fashion to collect solid particles produced from the burning of the gas generant 52. The filter prevents particles from entering the folded airbag and possibly causing structural damage to the airbag cushion. The filter 37 also serves as a heat sink to reduce the temperature of the inflation gas.

The embodiments shown in FIGS. 2–5 correspond largely to the embodiment show in FIG. 1. Equivalent components have therefore been designated with the same reference numbers. The inflator 10 shown in FIG. 2 has a choke plate 30 for regulating the gas flow that exits the generant cup 26. The choke plate 30 has generally a disk shape with a plurality of openings 31 for the passage of inflation gas. The size and number of aperture openings 31 in the choke plate 30 may vary without departing from the scope of the present invention.

With continued reference to FIG. 2, the inflator 10 has an inflator housing 35, which has a cylindrical cup shape associated therewith. The open end of the inflator housing 35 is fixedly attached to the igniter retainer 12. The inflator housing 35 has a plurality of exit ports 40 arranged around the circumference thereof. The filter 37, the choke plate 30, and the generant cup 26 are placed in the inflator housing 35 whereby the filter 37 is positioned closest to the closed end 36 of the inflator housing 35. The choke plate 30 is positioned adjacent to the filter 37, and the generant cup 26 is disposed adjacent to the choke plate 30. The exit ports 40 are aligned with the filter 37 or in other words a geometric plane that is perpendicular to the inflator housing 35 and passes through the exit ports 40 will cut through a portion of the filter 37. The number and size of the exit ports 40 may vary so long as the inflator 10 is thrust neutral when inflation gas exits the inflator 10.

With reference to FIG. 3, the combustion chamber 45 has a different design. The combustion chamber 41 shown in FIG. 1 tapers inward closer to the second end 44 than the first end 43 of the combustion chamber 41 whereas the combustion chamber 45 shown in FIG. 3 tapers inward closer to the first end 43 than the second end 44 of the combustion chamber 45.

With reference to FIG. 4, the igniter retainer 14 has a different design than the igniter retainer 12 represented in FIG. 1. The igniter retainer 14 represented in FIG. 4 may be made from a metallic material or from a plastic material. The igniter retainer 14 has a protrusion 15 whereby the widest portion of the protrusion 15 is located approximately evenly spaced from the ends of the igniter retainer 14. For assembly purposes, the combustion chamber 41 is crimped around the flat portion 16 of the protrusion 15 so that the protrusion 15 of the igniter retainer 14 is disposed inside the combustion chamber 41. The generant cup 26 in the inflator 10 in FIG. 4 does not contain a lid.

With reference to FIG. 5, the inflator 10 does not have a generant cup 26. The gas generant 52 is stored in the combustion chamber 46. The combustion chamber 46 has a plurality of apertures 42 situation on the second end 44 of the combustion chamber 46. The apertures 42 are sealed with a burst foil 50 adhered to the second end to prevent the incursion of moisture into the combustion chamber 46. The igniter retainer 17 is fixedly attached via a circumferential weld to the first end 43 of the combustion chamber 46. The igniter retainer 17 has generally a cylindrical shape and about half of the igniter retainer 17 is telescopically inserted into the combustion chamber 46. The gas generant 52 in the combustion chamber is hermetically sealed because the apertures 42 are covered by a burst foil 50 and the igniter retainer 17 closes the open end of the combustion chamber 46.

The operation of the inflator shown in FIGS. 1–4 will now be discussed. Upon detection of an imminent crash or an actual crash, the electronic control unit (not shown) sends a firing signal to the igniter 11 of the inflator 10. The current flows across the bridge wire of the igniter 11. The bridge wire generates sufficient heat to ignite the ignition material 18. The retaining ring channels the hot gases from the ignition material 18 to the lid 28 of the generant cup 26. Consequently, the hot gases from the ignition material 18 burst the lid 28 of the generant cup 26 and initiate the burning of the gas generant 52 in the generant cup 26. The inflation gas ruptures the bottom 29 of the generant cup 26 and flows through the apertures 42 of the diffuser chamber 41, 45 (FIGS. 1, 3, and 4) or the openings 31 in the choke plate 30 (FIG. 2). The inflation gas flows substantially parallel with the longitudinal axis of the cylindrically shaped inflator 10, and a majority of the gas molecules of the inflation gas collide with the closed end 36 of the filter housing 51 (FIGS. 1, 3, and 4) or the inflator housing (FIG. 2). The collision with the closed end 36 causes the gas molecules to reflect off of the closed end 36 before passing through the filter 37 resulting in a tortuous flow path for the inflation gas. This tortuous flow path reduces the kinetic energy of the gas molecules and hence cools the inflation gas. The inflation gas travels though the filter 37, which traps the solid particles carried by the inflation gas, and ultimately the inflation gas leaves the inflator 10 via the exit ports 40. In each figure (1, 2, 3, 4 and 5), The exit ports 40 are arranged in closer proximity to the openings 31 or apertures 42 and second end 44 of the combustion chamber 41 than the closed end 36 of the filter housing 51 in order to increase the length of time the gas molecules travel within the inflator since a majority of the gas molecules reflect off the closed end 36 of the filter housing 51 or inflator housing (FIG. 2).

The operation of the inflator 10 shown in FIG. 5 is slightly different because the inflator 10 does not have a generant cup 26. For the inflator 10 in FIG. 5, hot gases from the ignition material 18 flow directly into the combustion chamber 46 to ignite the gas generant 52. The force from the inflation gas ruptures the burst foil 50 allowing the hot combustion gases to flow into the filter housing 51. The inflation gas flows substantially parallel with the longitudinal axis of the cylindrically shaped inflator 10, and a majority of the gas molecules of the inflation gas collide with the closed end 36 of the filter housing 51. The collision with the closed end 36 causes the gas molecules to reflect off of the closed end resulting in a tortuous flow path for the inflation gas. Afterwards, the inflation gas travels through the filter 37 and then out of the inflator 10 via the exit ports 40.

In all cases it is understood that the above-described embodiments are merely illustrative of but a few of the many possible specific embodiments which represent the applications of the principles of the present invention. Numerous and varied other arrangements can be readily devised by those skilled in the art without departing from the spirit and scope of the invention.

We claim:

1. An inflator of cylindrical shape having a longitudinal axis comprising:
    an igniter having ignition material that burns upon application of heat;
    one gas generant disposed adjacent to the igniter whereby the igniter directly ignites the gas generant;
    a generant cup, the generant cup having a cylindrical shape with an open end and a closed end bottom for storing the gas generant wherein the open end of the gas generant cup faces the igniter, a rupture lid is fixedly attached to the open end of the generant cup creating an air-tight environment for the gas generant, and the closed end bottom is rupturable upon burning of the gas generant to create a gas flow path outward the ruptured bottom end;
    a plurality of apertures adjacent the closed end bottom of the generant cup for directing the gas flow substantially parallel to the longitudinal axis of the inflator;
    a tubular filter positioned adjacent to the apertures; and
    a filter housing that receives the entire filter, the filter housing having a closed end and a plurality of exit ports arranged around the circumference thereof whereby each of the exit ports is aligned with the filter and is in closer proximity to the apertures than to the closed end, wherein the inflation gas for filling an airbag is produced only from the burning of the ignition material and the gas generant and the majority of gas molecules reflect off the closed end then through the filter and out of the inflator via the exit ports.

2. The inflator according to claim 1 further comprising a retaining ring surrounding the ignition material of the igniter and having generally a cylindrical shape, the retaining ring focusing gaseous products from burning of the ignition material into the rupture lid of the generant cup.

3. The inflator according to claim 1 further comprising a combustion chamber, the combustion chamber fully receiving the generant cup wherein the combustion chamber has a first end facing the igniter and a second end has the plurality of apertures.

4. The inflator according to claim 3 wherein a wall of the combustion chamber tapers inward closer to the second end of the combustion chamber.

5. The inflator according to claim 3 wherein a wall of the combustion chamber tapers inward closer to the first end of the combustion chamber.

6. The inflator according to claim 3 wherein the second end of the combustion chamber is telescopically inserted into an open end of the filter housing.

7. The inflator according to claim 3 wherein a longitudinal axis of the generant cup is coaxial with a longitudinal axis of the filter, wherein one end of the filter contacts the second end of the combustion chamber.

8. A The inflator according to claim 7 wherein the plurality of exit ports are arranged in one row around the circumference of the filter housing, wherein atmospheric gas is present inside the filter housing.

9. The inflator according to claim 8 wherein the exit ports are arranged closer to the second end of the combustion chamber than the closed end of the filter housing.

10. An inflator of cylindrical shape having a longitudinal axis comprising:
    an igniter having ignition material that burns upon application of heat;
    one gas generant disposed adjacent to the igniter whereby the igniter directly ignites the gas generant;
    a combustion chamber for storing the gas generant, the igniter received in a first end of the combustion chamber, a second sealed end of the combustion chamber having a plurality of apertures covered by a burst foil for gas to flow out of the combustion chamber substantially parallel to the longitudinal axis;

a tubular filter positioned adjacent to the apertures; and a filter housing that receives the entire filter, the filter housing having a closed end and a plurality of exit ports arranged around the circumference thereof whereby each of the exit ports is aligned with the filter and is in closer proximity to the apertures than to the closed end, wherein the inflation gas for filling an airbag is produced only from the burning of the ignition material and the gas generant and the majority of gas molecules reflect off the closed end then through the filter and out of the inflator via the exit ports.

11. The inflator according to claim 10 further comprising an igniter retainer for holding the igniter, wherein the igniter retainer is attached to the first end of the combustion chamber.

12. The inflator according to claim 10 wherein the plurality of exit ports are arranged in one row around the circumference of the filter housing, wherein atmospheric gas is present inside the filter housing.

13. The inflator according to claim 12 wherein the exit ports are arranged closer to the second end of the combustion chamber than the closed end of the filter housing.

14. A cylindrically shaped inflator having a longitudinal axis comprising:

an igniter having ignition material that burns upon application of heat;

one gas generant disposed adjacent to the igniter whereby the igniter directly ignites the gas generant;

a generant cup, the generant cup having a cylindrical shape with an open end and a closed end bottom for storing the gas generant wherein an open end of the gas generant cup faces the igniter, and the bottom is rupturable upon burning of the burning of the gas generant to create a gas flow path outward the ruptured bottom;

a plurality of apertures adjacent the closed end bottom of the generant cup for directing the gas flow substantially parallel to the longitudinal axis of the inflator;

a tubular filter positioned adjacent to the gas generant; and an inflator housing that receives the entire filter, the inflator housing having a closed end and a plurality of exit ports arranged around the circumference thereof whereby each of the exit ports is aligned with the filter and is in closer proximity to the plurality of apertures than to the closed end, wherein the inflation gas for filling an airbag is produced only from the burning of the ignition material and the gas generant and the majority of gas molecules reflect off the closed end then through the filter and out of the inflator via the exit ports.

15. The inflator according to claim 14 wherein the inflator housing completely receives the filter and the generant cup, wherein the plurality of exit ports are closer to the generant cup than the closed end of the inflator housing.

16. The inflator according to claim 14 further comprising a choke plate having the plurality of apertures for regulating the gas flow of the inflation gas whereby the choke plate is disposed between the generant cup and the filter.

* * * * *